United States Patent [19]

Ueno et al.

[11] 4,240,928
[45] * Dec. 23, 1980

[54] TITANIUM TRICHLORIDE CATALYST AND PROCESS FOR THE PRODUCTION THEREOF

[75] Inventors: Hiroshi Ueno, Namekawa; Naomi Inaba, Ooi; Tukuo Makishima, Kawagoe; Koh Watanabe, Kunitachi; Shozo Wada, Zushi, all of Japan

[73] Assignee: Toa Nenryo Kogyo Kabushiki Kaisha, Tokyo, Japan

[*] Notice: The portion of the term of this patent subsequent to Jan. 8, 1997, has been disclaimed.

[21] Appl. No.: 927,803

[22] Filed: Jul. 25, 1978

Related U.S. Application Data

[63] Continuation-in-part of Ser. No. 774,964, Mar. 7, 1977, abandoned.

[30] Foreign Application Priority Data

Mar. 8, 1976 [JP] Japan ................................ 51-24121
Jul. 25, 1977 [JP] Japan ................................ 52-88314

[51] Int. Cl.$^3$ .............................................. C08F 4/64
[52] U.S. Cl. ................................ 252/429 B; 252/441; 526/142; 526/144
[58] Field of Search ........................... 252/429 B, 441

[56] References Cited

U.S. PATENT DOCUMENTS 3,825,524   7/1974   Wada et al. .................... 252/429 B

FOREIGN PATENT DOCUMENTS 50-112289   9/1975   Japan .
50-143790  11/1975   Japan .
1391068     4/1975   United Kingdom .
1484086     8/1977   United Kingdom .
1548573     7/1979   United Kingdom .

*Primary Examiner*—Patrick Garvin
*Attorney, Agent, or Firm*—B. C. Cadenhead

[57] ABSTRACT

A titanium trichloride catalytic complex is produced by reducing titanium tetrachloride with an alkylaluminum halide composition at low temperature and then treating the resulting reduced solids product by contacting it at elevated temperature with a dialkyl ether having alkyl groups of 4 to 5 carbon atoms and with hexachloroethane, the proportion of dialkyl ether being at least 1 mol per 1 mol of hexachloroethane and the proportion of hexachloroethane being at least greater than about 0.5 mol per 1 gram atom of titanium in the reduced solids product. The resulting titanium trichloride complex composition, when employed as co-catalyst with an organo-metal compound for Ziegler-type catalysts in polymerization of $\alpha$-olefins, results in uniform polymer grains with unexpectedly high polymerization activity and high stereoregular polymer yielding ratios.

24 Claims, No Drawings

TITANIUM TRICHLORIDE CATALYST AND PROCESS FOR THE PRODUCTION THEREOF

CROSS-REFERENCE TO RELATED APPLICATIONS

This application is a continuation-in-part of U.S. patent application Ser. No. 774,964, filed Mar. 7, 1977 and now abandoned.

BACKGROUND OF THE INVENTION

1. Field of Invention

This invention relates to a process for the production of a titanium trichloride catalyst and a process for the polymerization of α-olefins using this catalyst and, more particularly, it is concerned with an improved process for producing a titanium trichloride catalyst by treating a reduced solids product, obtained by reducing titanium tetrachloride with an alkylaluminum halide composition at low temperature, with a dialkyl ether and hexachloroethane, and a process for using the resulting catalyst as a co-catalyst with an organo-metal compound for the polymerization of α-olefins.

2. Discussion of Prior Art

Several methods have recently been described in the published patent literature which relate to preparation of titanium trichloride compositions. Generally, these methods include treating a reduced solids product, obtained by low temperature reduction of titanium tetrachloride with an organo aluminum compound, with complexing agents and with various halogenated compounds to obtain titanium trichloride catalyst compositions useful as a co-catalyst with an organo-metal compound for the polymerization of α-olefins.

More particularly, in Japanese Patent Application (OPI) No. 34478/1972 (published on Nov. 21, 1972, corresponding to British Pat. No. 1,391,068) a process is described which comprises treating such reduced solids product with a complexing agent, e.g., an ether, and titanium tetrachloride. However, as disclosed, this method requires the use of titanium tetrachloride at relatively high concentrations to produce catalytic complexes comprising $TiCl_3$ having high activity and very good stereospecificity in polymerization of α-olefins.

In Japanese Patent Application (OPI) No. 112289/1975 (published on Sept. 3, 1975), there is described a process wherein such titanium trichloride-containing reduced solids product is treated with a complexing agent, e.g., ethers, and then the resulting brown $TiCl_3$-containing catalyst is treated with carbon tetrachloride. Additionally, in Japanese Patent Application (OPI) No. 143790/1975 (published on Nov. 19, 1975) a method is described comprising treating such reduced solids product with a mixture of a complexing agent and carbon tetrachloride.

In Japanese Patent Application (OPI) No. 149897/1976 (published on Dec. 23, 1976, corresponding British Pat. No. 1,484,086) a process for the preparation of violet $TiCl_3$ is described in which a brown titanium trichloride, obtained by the above-mentioned low temperature reduction of $TiCl_4$ with an organo aluminum halide, is subjected to a heating treatment in the presence of a halogenated aliphatic or aromatic hydrocarbon. It is further disclosed that the brown titanium trichloride obtained by the reduction step may be treated with a complexing agent, including ethers, prior to the heating treatment in the presence of the halogenated aliphatic or aromatic hydrocarbon.

In Japanese Patent Application (OPI) No. 227/1977 (published on Jan. 5, 1977) a process is disclosed which comprises heat-treating the reduced solid, treating it with a complexing agent and then treating the resulting solids with an alkylaluminum dihalide or titanium tetrachloride or a reagent capable of forming titanium tetrachloride in situ such as, for example, carbon tetrachloride.

Furthermore, in U.S. Pat. No. 3,825,524, there is disclosed a process for producing a titanium trichloride catalyst having high activity which includes extracting a crude titanium trichloride composition, obtained by reducing titanium tetrachloride with an organoaluminum chloride, with a mixed solvent system composed of (i) a main solvent of aliphatic or aromatic hydrocarbons, aromatic chlorinated hydrocarbons or trichloroethylene, and (ii) an auxilliary solvent, including ethers.

The inventors have already proposed, in parent U.S. application Ser. No. 774,964, now abandoned, a process for the production of a titanium trichloride catalyst complex capable of exhibiting very excellent catalytic performances in the polymerization of α-olefins in the presence of an organo metal compound, for example, in respect of polymerization activity, stereoregular properties and particle properties of the resultant polymer particles. Parent application Ser. No. 774,964, now abandoned, which is incorporated herein by reference as if copied in full, describes and claims a process which comprises reducing titanium tetrachloride with an organoaluminum halide compound at low temperature and then treating at elevated temperature the resulting reduced solids product with a chlorinated saturated hydrocarbon having two carbon atoms in the presence of an ether complexing agent.

The inventors have made further studies in detail on this method and consequently have found that a titanium trichloride catalyst showing surprisingly excellent catalytic properties is obtained when the reduced solids product is treated with very specific proportions of a dialkyl ether having alkyl groups of 4 to 5 carbon atoms and hexachloroethane under very specific treatment conditions. So far as is presently known, there is no prior art which shows the specific process which the inventors have found leads to the production of a titanium trichloride catalyst of such excellent α-olefin polymerization performance.

SUMMARY OF THE INVENTION

In accordance with the present invention, a titanium trichloride catalyst composition is produced by reducing titanium tetrachloride with an alkylaluminum halide at low temperatures, e.g., about −50 to about +30° C.) and then contacting the resulting reduced solid with a dialkyl ether having alkyl groups of 4 to 5 carbon atoms each and with hexachloroethane at a temperature within the range of about 50° C. to about 100° C. for about 1 to about 10 hours. This treatment is effectuated by employing hexachloroethane in a proportion of at least greater than about 0.5 mol per 1 gram atom of titanium in the reduced solid and employing dialkyl ether in a proportion of at least 1 mol to 1 mol of hexachloroethane.

The use of the resulting titanium trichloride catalyst composition of the present invention as a cocatalyst with an organo-metal compound for a Ziegler-type catalyst for the polymerization of α-olefins under conventional α-olefin polymerization conditions results in uniform polymer grains and exhibits very high polymerization activity and a high stereoregular property. The titanium trichloride catalyst of the present invention, having improved uniform particle size, contributes to a great extent to rationalization of the production process because of being easy to handle in the polymerization step of α-olefins.

DETAILED DESCRIPTION OF THE INVENTION

The titanium trichloride-containing reduced solid (herein referred to as "reduced solid") used in the present invention is obtained by reducing titanium tetrachloride with an alkylaluminum halide at low temperature (e.g., $-50°$ C. to $+30°$ C.) as described in parent Application U.S. Ser. No. 774,964. The alkylaluminum halide preferably used is represented by the general formula $R_nAlX_{3-n}$, wherein R represents an alkyl group having 1 to 18 carbon atoms, most preferably 2 to 6 carbon atoms, X represents a halogen atom, most preferably chloride, and n represents a suitable numeral within the range of $1 \leq n \leq 3$, or a mixture or complex compound thereof. In particular, it is preferable to use alkylaluminum compounds such as trialkylaluminums, dialkylaluminum halides, monoalkylaluminum dihalides and alkylaluminum sesquihalides, mixtures or complex compounds thereof. Examples of trialkylaluminums which may be used are trimethylaluminum, triethylaluminum and tributylaluminum. Examples of dialkylaluminum halides are dimethylaluminum chloride, diethylaluminum chloride, dibutylaluminum chloride, diethylaluminum bromide and diethylaluminum iodide. Examples of the monoalkylaluminum dihalides are methylaluminum dichloride, ethylaluminum dichloride, butylaluminum dichloride, ethylaluminum dibromide and ethylaluminum diiodide. Moreover, ethylaluminum sesquichloride is given as an example of the alkylaluminum sesquihalides. Triethylaluminum, diethylaluminum chloride, ethylaluminum dichloride, ethylaluminum sesquichloride or their mixtures or complex compounds, for example, a mixture of diethylaluminum chloride and ethylaluminum dichloride is particularly preferable because these compounds are readily obtainable commercially and exhibit excellent effects.

The reduction step is ordinarily carried out at a specified temperature between $-50°$ C. and $+30°$ C. by contacting titanium tetrachloride with the above-described alkylaluminum halide compound in a manner whereby the specified temperature may be controlled. By way of example, to a solution of titanium tetrachloride in an inert solvent or diluent, e.g., a hydrocarbon having 5 to 12 carbon atoms such as n-pentane, isopentane, cyclopentane, n-hexane or isooctane, may be added dropwise a solution of alkylaluminum halide compound in such an inert solvent or diluent. Conversely, a solution of titanium tetrachloride can be added dropwise to a solution of the alkylaluminum halide compound and it is not always necessary to use the solutions dissolved in inert solvents so long as temperature control is maintained. The quantity of alkylaluminum halide compound used is ordinarily about 0.5 to about 5 gram atoms as aluminum per 1 gram atom of titanium.

The specific temperatures and quantities of alkylaluminum halide employed in the reduction step may vary somewhat, depending upon the specific alkylaluminum halide employed. For example, in the case of using diethylaluminum chloride (which will hereinafter be referred to as "DEAC") as a dialkylaluminum halide, it is preferable to carry out the reduction at a temperature of about $-50°$ C. to about $+30°$ C., particularly about $-5°$ C. to about $+5°$ C., and to use DEAC in a proportion of about 0.5 to about 5 mols, particularly about 0.8 to about 1.5 mols, to 1 mol of titanium tetrachloride. In the case of using a mixture or complex of a dialkylaluminum halide and alkylaluminum dihalide, for example, DEAC and ethylaluminum dichloride (which will hereinafter be referred to as "EADC"), it is preferable to carry out the reduction at a temperature of about $-50°$ C. to about $+30°$ C., particularly about $-5°$ C. to about $+5°$ C., and to use DEAC in a proportion of about 0.5 to about 4 mols, particularly about 0.8 to about 1.5 mols, and EADC in a proportion of about 0.01 to about 1.5 mols, particularly about 0.1 to about 1.2 mols, respectively based on 1 mol of titanium tetrachloride.

The time of reactant addition during the reduction step may vary, depending upon the quantity of reactants used for production of a desired quantity of reduced solid so as to maintain the specified reduction temperature. However, reactant addition, e.g., dropwise addition, is usually carried out for a period of time for about 30 minutes to about 3 hours.

Preferably, after reactant addition the reaction mixture is aged in order to complete the reduction reaction. Aging may be carried out by gradually elevating the temperature of the reaction mixture to a specified temperature within the range of about $20°$ C. to about $100°$ C. over a period of time of about 1 to 2 hours. Most preferably, aging is carried out by holding the reaction mixture, after reactant addition, at the reduction temperature for about one-half hour and then gradually elevating the temperature to about $65°$ over a period of about 1 hour and finally holding the reaction mixture at about $65°$ C. for about 1 hour. Some caution should be taken, however, during the aging to prevent subjecting the reduced solid to too great a temperature for too long a period of time which may result in conversion of the titanium trichloride-containing reduced solid to a more crystalline form.

The reduced solid obtained in this way is separated, washed in an inert solvent or diluent, if desirable, and used as the reduced solid of the present invention as it is or after drying in a conventional manner.

The so obtained reduced solid used in the present invention is, generally, an amorphous solid having a complicated composition comprising, as a main component, titanium trichloride and an alkylaluminum halide compound used for the reduction, or a reaction product of titanium tetrachloride and the alkylaluminum halide compound. This composition varies depending upon the reducing methods and conditions. Where titanium tetrachloride is reduced with a mixture of DEAC and EADC, it comprises, as a main component, titanium trichloride and EADC and, in addition, aluminum compounds in various forms, the proportion of aluminum being about 0.2 gram atoms or more to 1 gram atom of titanium. Furthermore, the so obtained reduced solid contains titanium trichloride of the β-type and is brown to red-violet in color, depending upon specific reduction conditions employed.

As the dialkyl ether comprising alkyl groups each having 4 to 5 carbon atoms which is contacted with the reduced solids and which the inventors have found to form an essential aspect of this invention, there are generally used symmetrical or asymmetrical ethers whose alkyl groups are selected from n-butyl group, isobutyl group, n-amyl group, isoamyl group, 2-methylbutyl group and 2-ethylpropyl group. In particular, di-n-butyl ether, diisoamyl ether and n-butyl isoamyl ether are preferably used.

The treatment step of the present invention, that is the contact of the reduced solid with thhe above-described ether and hexachloroethane, can be carried out by adding the reduced solid to an inert solvent or diluent, as previously described, to prepare a suspension and then adding the ether and hexachloroethane thereto in order; by adding the ether to the reduced solid to prepare a suspension and then adding thereto hexachloroethane or a solution of hexachloroethane in the ether or an inert solvent; or by adding the reduced solid to a mixture solution of the ether and hexachloroethane or a mixed solution of ether, hexachloroethane and an inert solvent. The most convenient and favorable method on a commercial scale consists in suspending the reduced solid in an inert solvent and then adding a mixture of the ether, hexachloroethane and an inert solvent to the suspension.

In accordance with the present invention, it is an essential condition to contact the reduced solid with hexachloroethane in the presence of the ether in a proportion of at least 1 mol or more, preferably 1 mol to about 2.5 mols, to 1 mol of hexachloroethane. The effects of the present invention cannot be obtained if lower proportions of ether to hexachloroethane are employed. Moreover, the effects of the present invention cannot be obtained if the reduced solid is contacted firstly with hexachloroethane or if the reduced solid is contacted firstly with the ether and, after removing the ether, is then contacted with hexachloroethane. As exemplified in the following Examples the treatment with ether and hexachloroethane exhibits a synergistic effect resulting in a catalyst having surprisingly excellant catalytic performance.

In the present invention, the relative quantities of the ether and hexachloroethane used are important as described above, and, moreover, the quantity of hexachloroethane used is also important and exceeds generally 0.5 mol, preferably ranging from greater than 0.5 mol to about 1.5 mols, and particularly ranging from about 0.6 mol to about 1.2 mols, per 1 gram atom of titanium in the reduced solid. If the quantity of hexachloroethane used is less than the lower limit, the polymerization activity is not so increased when the titanium trichloride catalyst is used with an organo-metal compound for the polymerization of α-olefins, while the excessive addition thereof is not only poor economy, but also results in various disadvantages in that the particle size distribution of the polymer particles is deteriorated and the yield of catalyst produced is lowered when the reduced solid is treated at higher temperatures (e.g., 85° C. or higher).

As mentioned hereinabove, the treatment step of the present invention is carried out at a temperature of about 50° C. to about 100° C. for a period of time of about 1 to about 10 hours. Utilization of temperatures and times outside these ranges will not result in production of titanium trichloride catalyst in good yields and having α-olefin polymerization performances to which this invention pertains. There are optimum conditions within these ranges, depending upon the property, composition and alike of the reduced solid, but, in general, at lower temperatures, this treatment should be carried out over longer times and at higher temperatures, it can be carried out in relatively shorter times. Most preferably, the treatment is performed at about 80° C. to about 90° C. for about 3 to about 7 hours.

After the treatment step, the so obtained titanium trichloride catalyst of the present invention is separated from the supernatent, washed with inert solvent or diluent and optionally dried in conventional manners. During the treatment step, the titanium trichloride of the reduced solid is converted whereby the so obtained titanium trichloride catalyst contains titanium trichloride of the δ-type, according to the classification generally adopted (Journal of Polymer Science, 51, 1961, pp. 399–410). The so obtained titanium trichloride catalyst has a violet to purple color.

The titanium trichloride catalyst of the present invention is ordinarily used as a catalyst for the polymerization of α-olefins in contact with an organo-metal compound which is used as a co-catalyst for the Ziegler-type catalyst, for example, monoalkylaluminum dichloride, dialkylaluminum monochloride or trialkylaluminum. If necessary, various compounds, for example, complexing agents, such as ethers, amines or amides can further be added as a third component.

The catalyst system for the polymerization of α-olefins employing the titanium trichloride catalyst of the present invention is very excellent as a catalyst for the homopolymerization or copolymerization of α-olefins such as propylene, butene-1, 4-methyl-pentene-1, ethylene, etc., and give uniform polymer particles with a high polymerization activity and a high stereo-regular polymer ratio in the polymerization of α-olefins in an inert solvent, liquid monomer and gaseous phase under conventional α-olefin polymerization conditions. As exemplified below, titanium trichloride catalysts prepared in accordance with this invention, when used to polymerize propylene, exhibits catalytic activities of greater than about 2200 grams of formed polymer per 1 gram of $TiCl_3$ catalyst having at least 95% heptane insolubles content, based on the polymerization test described in Example 1. Therefore, this catalyst will render greater services to the industry.

The present invention will now be illustrated in detail by the following Examples in which the reduced solid obtained by reducing titanium tetrachloride with DEAC or a mixture of DEAC and EADC is used for the sake of convenience, but is not intended to be limited thereby.

EXAMPLE 1

700 ml of purified heptane and 250 ml of titanium tetrachloride were charged in a 2000 ml flask equipped with a stirrer and placed in a constant temperature water bath kept at 0° C. and mixed. Then a mixture of 315 ml of DEAC (1.1 mols to 1 mol of titanium tetrachloride), 117 ml of EADC (0.5 mol to 1 mol of titanium tetrachloride) and 400 ml of purified heptane was dropwise added to this heptane solution of titanium tetrachloride kept at 0° C. for a period of time of 3 hours. After the dropwise addition, the reaction mixture was heated for 1 hour to 65° C. while stirring and the stirring was further continued at the same temperature for another hour to complete the reduction so as to obtain a reduced solid. The resulting reduced solid was separated, washed with purified heptane and dried at 65° C. for 30 minutes under reduced pressure. The resulting amorphous reduced solid was red-violet and the X-ray diffraction spectrum thereof showed peaks at $2\theta = 16.30°$ and $2\theta = 42.4°$ (β-type) which were considerably smaller than peaks at $2\theta=15.10°$ and $2\theta=51.3°$ ($\delta$-type).

20 g of this reduced solid was charged in a 300 ml flask, to which 50 ml of purified heptane was then added, and the mixture was then stirred to disperse the reduced solid and to prepare a suspension. Then, 50 ml of a mixed solution consisting of 16 ml di-n-butyl ether, 15.7 g of hexachloroethane and heptane was added thereto, which had been previously prepared so as to contain the ether in a proportion of 1 gram mol to 1 gram atom of titanium in the reduced solid and the hexachloroethane in a proportion of 0.7 gram mol to 1 gram atom of titanium in the reduced solid.

Then the content in the flask was stirred at 85° C. for 5 hours to contact the reduced solid with the di-n-butyl ether and hexachloroethane, thus obtaining a titanium trichloride catalyst. The so obtained titanium trichloride catalyst was separated, washed five times with 100 ml of purified heptane and dried at 65° C. for 30 minutes to obtain a dried powder of titanium trichloride catalyst with a yield of 89% as titanium. The resulting titanium trichloride catalyst was purple in color.

A polymerization test of the titanium trichloride catalyst of the present invention was carried out by the following procedure. A glass ampoule charged with 100 mg of the titanium trichloride catalyst and DEAC in a proportion corresponding to 4 mols to 1 gram atom of titanium were charged in a 1000 ml autoclave, into which 600 ml (Normal State) of hydrogen and then 800 ml of liquid propylene were introduced. After heating the contents in the autoclave at 68° C., the polymerization was started by breaking the ampoule and continued for 30 minutes. Thereafter, the unreacted propylene was removed and removal of catalyst was removed in a conventional manner, by contacting the polymer with atmospheric moisture and by drying under vacuum, to thus obtain 255 g of polypropylene with a bulk density of 0.45 g/cc. Therefore, the polymerization activity (g of formed polymer per 1 g of $TiCl_3$ catalyst, i.e., catalytic efficiency hereinafter referred to as "E") was 2550. The melt flow rate of this polypropylene (Melt Flow Rate -ASTM D 1238, hereinafter referred to as "MFR") was 4.8. The heptane-insoluble content (hereinafter referred to as "HI") was 98% measured by extracting this polypropylene with heptane for 5 hours using a Soxhlet extractor. Furthermore, the P.S.D. index was 0.20, being an index to show the particle size distribution of a polymer powder calculated by the following formula;

P.S.D. Index log (particle diameter ($\mu$) at 90% of integral particle diameter distribution curve/particle diameter ($\mu$) at 10% of integral particle diameter distribution curve).

COMPARATIVE EXAMPLE 1

20 g of the reduced solid obtained in Example 1 was taken in a 300 ml flask, to which 50 ml of purified heptane was added, and the mixture was stirred to prepare a suspension. Then, 16 ml of di-n-butyl ether, in a proportion of 1.0 mol to 1 gram atom of titanium in the reduced solid, was added to this flask and stirred at 85° C. for 30 minutes. After separating the reduced solid by removing the heptane and di-n-butyl ether, a solution of 15.7 g hexachloroethane, in a proportion of 0.7 mol to 1 gram atom of titanium in the reduced solid, dissolved in 50 ml of heptane, was added thereto and stirred at 85° C. for 5 hours to thus obtain a titanium trichloride catalyst. A polymerization test of the titanium trichloride catalyst obtained in this way was carried out in an analogous manner to Example 1 to obtain results as shown in Table 1:

Table 1

| Treatment of Reduced Solid | Example 1 | Comparative Example 1 |
|---|---|---|
| Quantity of di-n-butyl ether per 1 gram atom of titanium in reduced solid (gram mol) | 1.0 | 1.0 |
| Quantity of hexachloroethane per 1 gram atom of titanium in reduced solid (gram mol) | 0.7 | 0.7 |
| $(n-C_4H_9)_2O/C_2Cl_6$ (mol/mol) | 1.4 | 1.4 |
| Polymerization Test | | |
| E | 2550 | 1390 |
| HI | 98 | 92 |

A comparison of the results of Table 1 show the synergism of the ether and hexachloroethane in the treatment step of the present invention.

EXAMPLES 2 TO 3 AND COMPARATIVE EXAMPLES 2 TO 4

Titanium trichloride catalysts were prepared and polymerization tests were carried out in an analogous manner to Example 1, except changing the quantity of the hexachloroethane used in the treatment of the reduced solid. The results are shown, with the results of Example 1, in Table 2. As can be seen from these results, it is required that the quantity of hexachloroethane to be used must exceed 0.5 mol per 1 gram atom of titanium in the reduced solid and the quantity of the ether to be used must be 1 mol or more per 1 mol of the hexachloroethane in order to obtain excellent balances of catalyst activity and stereoregularity (heptane insoluble content).

Table 2

| Treatment of Reduced Solid | Example No. 1 | Example No. 2 | Example No. 3 | Comparative Example No. 2 | Comparative Example No. 3 | Comparative Example No. 4 |
|---|---|---|---|---|---|---|
| Quantity of di-n-butyl ether used per 1 gram atom of titanium in reduced solid (gram mol) | 1.0 | 1.0 | 1.0 | 1.0 | 1.0 | 1.0 |
| Quantity of hexachloroethane used per 1 gram atom of titanium in reduced solid (gram mol) | 0.7 | 0.6 | 0.8 | 0.2 | 0.5 | 1.3 |
| $(n-C_4H_9)_2O/C_2Cl_6$ mol/mol | 1.4 | 1.7 | 1.3 | 5 | 2 | 0.8 |
| Polymerization Test | | | | | | |
| E | 2550 | 2490 | 2750 | 970 | 2010 | 1800 |

Table 2-continued

| Treatment of Reduced Solid | Example No. 1 | 2 | 3 | Comparative Example No. 2 | 3 | Comparative Example No. 4 |
|---|---|---|---|---|---|---|
| HI | 98 | 97 | 98 | 80 | 95 | 97 |

EXAMPLES 4 TO 8 AND COMPARATIVE EXAMPLES 5 TO 7

Titanium trichloride catalysts were prepared and polymerization tests were carried out in an analogous manner to Example 1 except keeping constant the quantity of the hexachloroethane used for the treatment of the reduced solid in Example 1 and changing the quantity of the di-n-butyl ether. The results are shown in Table 3. It will clearly be understood from these results that if the quantity of hexachloroethane exceeds 0.5 gram mol per 1 gram atom of titanium in the reduced solid, the polymerization activiy is increased, while if the quantity of di-n-butyl ether used is less than 1 mol per 1 mol of the hexachloroethane, the polymerization activity is lowered. Additionally, as shown by Comparative Example 7, where ether used is high, the heptane insoluble content obtained is unacceptably low (94%).

EXAMPLE 12

700 ml of purified heptane and 250 ml of titanium tetrachloride were charged in a 2000 ml flask equipped with a stirrer and placed in a constant temperature water bath kept at 0° C., and mixed. Then a mixture of 315 ml of DEAC (1.1 mols to 1 mol of titanium tetrachloride) and 400 ml of purified heptane was dropwise added to this heptane solution of titanium tetrachloride kept at 0° C. for a period of 3 hours and adequately mixed. After the dropwise addition, the resulting product was heated to 65° C. and stirred for 1 hour. The resulting reduced solid was separated, washed with purified heptane adequately and dried at 65° C. for 30 minutes under reduced pressure to thus obtain a reduced solid to be used in the present invention.

20 g of the so obtained reduced solid was dispersed in 50 ml of purified heptane and to this dispersion was Table 3

| Treatment of Reduced Solid | Example No. 4 | 5 | 6 | 7 | 8 | Comparative Example No. 5 | 6 | 7 |
|---|---|---|---|---|---|---|---|---|
| Quantity of di-n-butyl ether used per 1 gram atom of titanium in reduced solid (gram mol) | 0.7 | 0.9 | 1.1 | 1.2 | 1.5 | 0.4 | 0.6 | 2.2 |
| Quantity of hexachloroethane used per 1 gram atom of titanium in reduced solid (gram mol) | 0.7 | 0.7 | 0.7 | 0.7 | 0.7 | 0.7 | 0.7 | 0.7 |
| $(n-C_4H_9)_2O/C_2Cl_6$ mol/mol | 1.0 | 1.3 | 1.6 | 1.7 | 2.1 | 0.6 | 0.9 | 3.1 |
| Polymerization Test | | | | | | | | |
| E | 2500 | 2530 | 2610 | 2510 | 2590 | 780 | 1950 | 2680 |
| HI | 96 | 98 | 98 | 97 | 96 | 83 | 95 | 94 |

EXAMPLES 9 TO 11 AND COMPARATIVE EXAMPLE 8

Titanium trichloride catalysts were prepared and polymerization tests thereof were carried out in an analogous manner to Example 1, except the treatment of the reduced solid used in Example 1 were effected with mixed solutions comprising di-n-butyl ether in a proportion of 1.5 gram mols per 1 gram atom of titanium in the reduced solid and hexachloroethane in various proportions, thus obtaining results shown in Table 4.

Table 4

| Treatment of Reduced Solid | Examples No. 9 | 10 | 11 | Comparative Example No. 8 |
|---|---|---|---|---|
| Quantity of di-n-butyl ether used per 1 gram atom of titanium in reduced solid (gram mol) | 1.5 | 1.5 | 1.5 | 1.5 |
| Quantity of hexachloroethane used per 1 gram atom of titanium in reduced solid (gram mol) | 0.6 | 1.0 | 1.2 | 0.5 |
| $(n-C_4H_9)_2O/C_2Cl_6$ (mol/mol) | 2.5 | 1.5 | 1.25 | 3.0 |
| Polymerization Test | | | | |
| E | 2510 | 2590 | 2530 | 2000 |
| HI | 95 | 98 | 98 | 95 | added 16 ml di-n-butyl ether, in a proportion of 1 gram mol to 1 gram atom of titanium in the reduced solid, followed by adequate agitation. Thereafter, to 50 ml of purified heptane was added 15.7 gm hexachloroethane, in a proportion of 0.7 gram mol to 1 gram atom of titanium in the reduced solid, to prepare a solution and this solution was added to the above described mixture. The mol ratio of ether to hexachloroethane was 1.4. The resultant mixture was stirred at 85° C. for 5 hours to contact the reduced solid with the di-n-butyl ether and hexachloroethane and a titanium trichloride catalyst was thus obtained. The thus obtained titanium trichloride catalyst was separated, washed with 100 ml of purified heptane five times and then dried at 65° C. for 30 minutes, thus obtaining a dry powder of titanium trichloride catalyst with a yield of 88% as titanium.

When a polymerization test was carried out in an analogous manner to Example 1, a polypropylene powder was obtained with E=2530, HI=98%, MFR=5.0, Bulk Density=0.51 g/cc and P.S.D. Index=0.19.

EXAMPLE 13

20 g of the reduced solid obtained in Example 1 was dispersed in 50 ml of purified heptane and to this dispersion was added 19 ml diisoamyl ether, in a proportion of 1 gram mol to 1 gram atom of titanium in the reduced solid, followed by adequate agitation. Thereafter, to 50 ml of purified heptane was added to 15.7 gm hexachloroethane, in a proportion of 0.7 gram mol to 1 gram atom of titanium in the reduced solid, to prepare a mixed solution. This mixed solution was then added to the above described mixture and stirred at 80° C. for 5 hours to obtain a titanium trichloride catalyst. The thus obtained titanium trichloride catalyst was adequately washed with purified heptane, separated from the heptane and then subjected to a polymerization test in an analogous manner to Example 1. Thus a polypropylene powder was obtained with E=2490, HI=98%, MFR=5.2, Bulk Density=0.50 g/cc and P.S.D. Index=0.20.

EXAMPLE 14

400 ml of purified heptane and 315 ml of DEAC (1.1 mols to 1 mol of titanium tetrachloride to be added hereinafter) were charged in a 2000 ml flask equipped with a stirrer and placed in a constant temperature water bath kept at 0° C. and mixed. Then a mixed solution of 700 ml of purified heptane and 250 ml of titanium tetrachloride was dropwise added over a period of 3 hours to the heptane solution while the temperature was kept at 0° C. After the dropwise addition, the resulting product was heated with agitation to 65° C. and further stirred for 1 hour at that temperature. The resulting reduced solid was separated, washed adequately with purified heptane and dried at 65° C. for 30 minutes under reduced pressure to thus obtain a reduced solid to be used in the present invention.

The reduced solid obtained in this way was subjected to a contact treatment with di-n-butyl ether and hexachloroethane in an analogous manner to Example 1, thus obtaining a titanium trichloride catalyst. A polymerization test using this catalyst was then carried out in analogous manner to Example 1 to thus obtain a polypropylene powder with E=2240, HI=97%, Bulk Density=0.46 g/cc and P.S.D. Index=0.22.

We claim:

1. A process for the production of a titanium trichloride catalyst composition comprising:
   reducing titanium tetrachloride with an alkylaluminum halide of the formula $R_nAlX_{3-n}$, wherein R is an alkyl group having 1 to 18 carbon atoms, X is a halogen atom, and n is a numeral within the range of $1 \leq n \leq 3$, said alkylaluminum halide being in a proporation of about 0.5 to about 5 gram atoms as aluminum per 1 gram atom of titanium in said titanium tetrachloride, at a temperature of about $-50°$ C. to about $+30°$ C. to produce a reduced solids product;
   contacting said reduced solids product with a dialkyl ether having alkyl groups of 4 to 5 carbon atoms each together with hexachloroethane at an elevated temperature of about 80° C. to about 90° C. for about 3 to about 7 hours, said hexachloroethane being in a proportion of at least greater than about 0.5 mol per 1 gram atom of titanium in the reduced solids product and said dialkyl ether being in a proportion of at least 1 mol per 1 mol of hexachloroethane; and
   recovering the resulting treated reduced solids product as a titanium trichloride catalyst.

2. The process of claim 1, wherein the hexachloroethane is in a proportion within the range of greater than about 0.5 mol to about 1.5 mols per 1 gram atom of titanium in the reduced solids product.

3. The process of claim 1, wherein said dialkyl ether is in a proportion within the range of at least 1 mol to about 2.5 mols per 1 mol of hexachloroethane.

4. The process of claim 1, wherein said hexachloroethane is in a proportion within the range from about 0.6 mol to about 1.2 mols per 1 gram atom of titanium in the reduced solids product and said dialkyl ether is in a proportion within the range of at least 1 mol to about 2.5 mols per 1 mol of hexachloroethane.

5. The process of claim 4, wherein said dialkyl ether is n-butyl ether.

6. The process of claim 1, wherein the alkylaluminum halide is selected from an alkylaluminum chloride having alkyl groups of 2 to 6 carbon atoms or mixtures thereof.

7. The process of claim 6, wherein the alkylaluminum chloride is selected from diethylaluminum chloride or a mixture of diethylaluminum chloride and ethylaluminum dichloride.

8. The process of claim 7, wherein the alkylaluminum chloride is diethylaluminum chloride, said hexachloroethane is in a proportion within the range of about 0.6 mol to about 1.2 mols per 1 gram atom of titanium in the reduced solids product, and said dialkyl ether is in a proportion within the range of at least 1.0 mol to about 2.5 mols per 1 mol of hexachloroethane.

9. The process of claim 8, wherein said dialkyl ether is n-butyl ether.

10. The titanium trichloride catalyst composition produced by the process of claim 1.

11. The titanium trichloride catalyst composition produced by the process of claim 4.

12. The titanium trichloride catalyst composition produced by the process of claim 7.

13. The titanium trichloride catalyst composition produced by the process of claim 8.

14. The titanium trichloride catalyst composition produced by the process of claim 9.

15. In an improved Ziegler-type catalyst composition adaptable for use in an alpha-olefin polymerization, comprising:
   (a) an organometal co-catalyst compound, in contact with;
   (b) a titanium trichloride catalyst composition, the improvement comprising:
employing as said titanium trichloride catalyst (b), a titanium trichloride catalyst produced by a process comprising:
   (i) reducing titanium tetrachloride with an alkylaluminum halide of the formula $R_nAlX_{3-n}$, wherein R is an alkyl group having 1 to 18 carbon atoms, X is a halogen atom, and n is a numeral within the range of $1 > n > 3$, said alkylaluminum halide being in a proportion of about 0.5 to about 5 gram atoms as aluminum per 1 gram atom of titanium in said titanium tetrachloride, at a temperature of about $-50°$ C. to about $+30°$ C. to produce a reduced solids product;
   (ii) contacting said reduced solids product with a dialkyl ether having alkyl groups of 4 to 5 carbon atoms each together with hexachloroethane at an elevated temperature of about 80° C. to about 90° C. for about 3 to about 7 hours, said hexachloroethane being in a proportion of at least greater than about 0.5 mol per 1 gram atom of titanium in the reduced solids product and said dialkyl ether being in a proportion of at least 1 mol per 1 mol of hexachloroethane; and (iii) recovering the resulting treated reduced solids product as a titanium trichloride catalyst.

16. The improved Ziegler-type catalyst composition of claim 15, wherein, in said process for producing said titanium trichloride catalyst, the hexachloroethane is in a proportion within the range of greater than about 0.5 mol to about 1.5 mols per 1 gram atom of titanium in the reduced solids product.

17. The improved Ziegler-type catalyst composition of claim 15, wherein, in said process for producing said titanium trichloride catalyst, said dialkyl ether is in a proportion within the range of at least 1 mol to about 2.5 mols per 1 mol of hexachloroethane.

18. The improved Ziegler-type catalyst composition of claim 15, wherein, in said process for producing said titanium trichloride catalyst, said hexachloroethane is in a proportion within the range from about 0.6 mol to about 1.2 mols per 1 gram atom of titanium in the reduced solids product and said dialkyl ether is in a proportion within the range of at least 1 mol to about 2.5 mols per 1 mol of hexachloroethane.

19. The improved Ziegler-type catalyst composition of claim 18, wherein, in said process for producing said titanium trichloride catalyst, said dialkyl ether is n-butyl ether.

20. The improved Ziegler-type catalyst composition of claim 15, wherein, in said process for producing said titanium trichloride catalyst, the alkylaluminum halide is selected from an alkylaluminum chloride having alkyl groups of 2 to 6 carbon atoms or mixtures thereof.

21. The improved Ziegler-type catalyst composition of claim 20, wherein, in said process for producing said titanium trichloride catalyst, the alkylaluminum chloride is selected from diethylaluminum chloride or a mixture of diethylaluminum chloride and ethylaluminum dichloride.

22. The improved Ziegler-type catalyst composition of claim 21, wherein, in said process for producing said titanium trichloride catalyst, the alkylaluminum chloride is diethylaluminum chloride, said hexachloroethane is in a proportion within the range of about 0.6 mol to about 1.2 mols per 1 gram atom of titanium in the reduced solids product, and said dialkyl ether is in a proportion within the range of at least 1.0 mol to about 2.5 mols per 1 mol of hexachloroethane.

23. The improved Ziegler-type catalyst composition of claim 22, wherein, in said process for producing said titanium trichloride catalyst, said dialkyl ether is n-butyl ether.

24. The titanium trichloride catalyst composition produced by the process of claim 6.

* * * * *